(12) United States Patent
Martin et al.

(10) Patent No.: US 7,595,633 B2
(45) Date of Patent: Sep. 29, 2009

(54) VELOCITY MEASUREMENT USING MAGNETORESISTIVE SENSORS

(75) Inventors: John R. Martin, Rio Rancho, NM (US); William M. Blevins, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 184 days.

(21) Appl. No.: 11/672,696

(22) Filed: Feb. 8, 2007

(65) Prior Publication Data

US 2008/0190191 A1    Aug. 14, 2008

(51) Int. Cl.
*G01P 3/66* (2006.01)
*H01L 43/08* (2006.01)
*G01L 5/14* (2006.01)
*F41A 31/00* (2006.01)

(52) U.S. Cl. .................. 324/179; 324/207.21; 42/1.01; 73/167

(58) Field of Classification Search .................. 324/178, 324/179, 207.2, 207.21, 207.22; 73/167; 42/1.01, 106
See application file for complete search history.

(56) References Cited

U.S. PATENT DOCUMENTS

| | | | | |
|---|---|---|---|---|
| 4,483,190 A | * | 11/1984 | Cornett | 73/167 |
| 6,144,197 A | * | 11/2000 | Shimamura et al. | 324/166 |
| 7,082,823 B1 | * | 8/2006 | Shipman et al. | 73/167 |

* cited by examiner

*Primary Examiner*—Kenneth J Whittington
(74) *Attorney, Agent, or Firm*—McDonnell Boehnen Hulbert & Berghoff LLP

(57) ABSTRACT

A method and a system for measuring the velocity of a projectile. The method and system employ sensors that uses magnetoresistive sensing elements to measure the velocity of a projectile. Two magnetoresistive based sensors may be used to sense a time at which a projectile crosses a sense path associated with each of the sensors. Because the sensors employ magnetoresistive sensing elements, high quality voltage signals are produced, allowing accurate time measurements to be calculated. Accordingly, the velocity of the projectile can be determined by using these time measurements along with a measured spacing distance between the sensors.

18 Claims, 3 Drawing Sheets

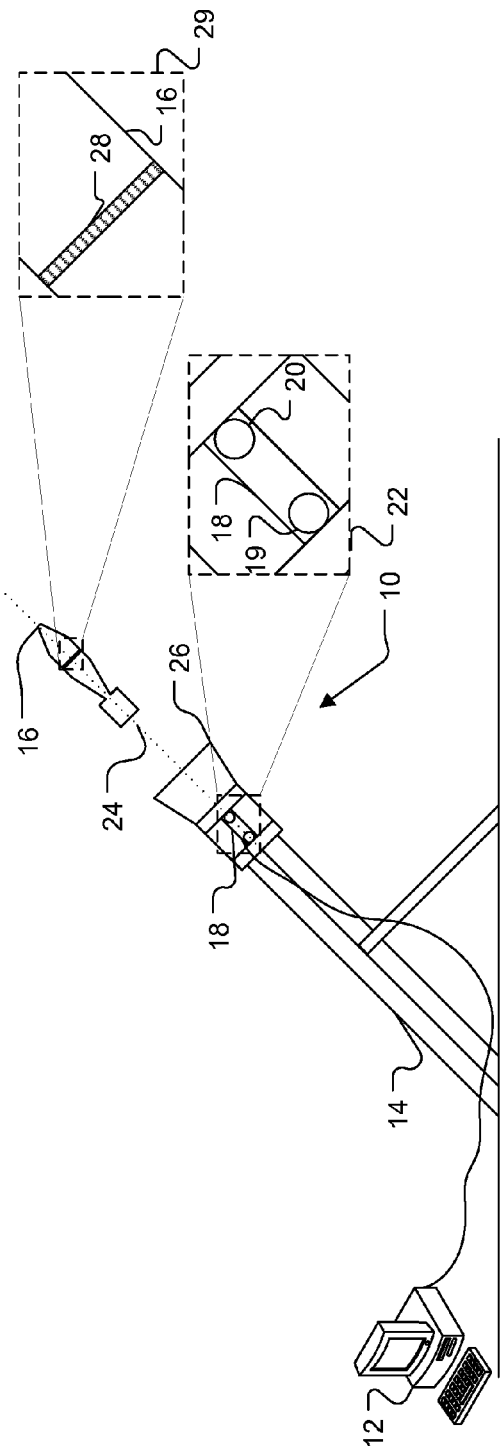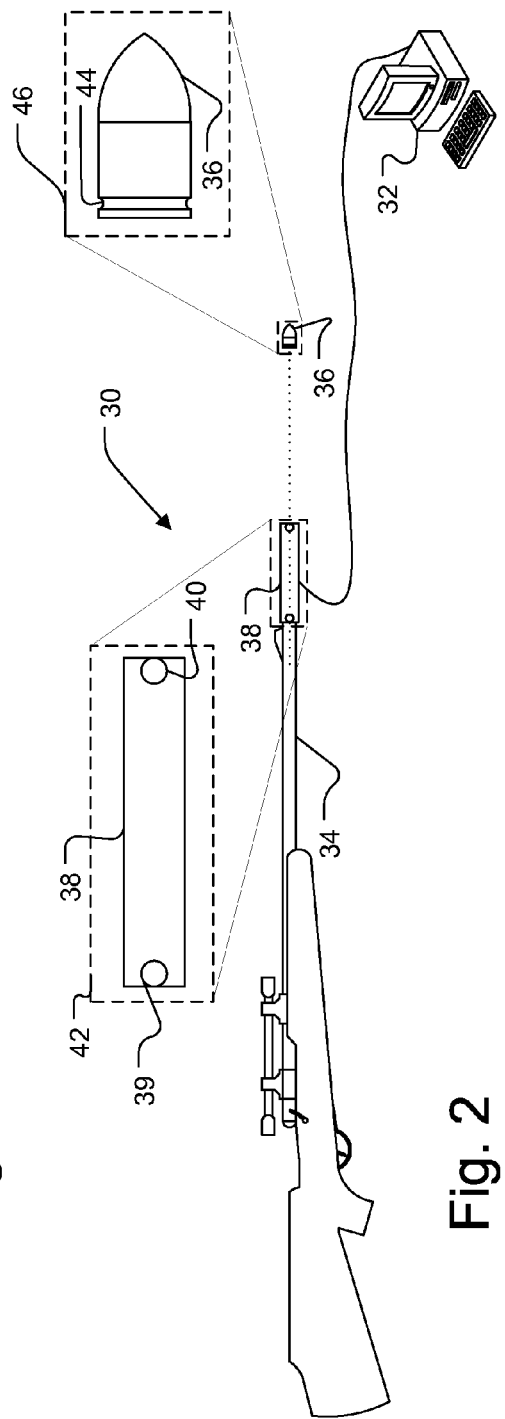
Fig. 1
Fig. 2

VELOCITY MEASUREMENT USING MAGNETORESISTIVE SENSORS

GOVERNMENT RIGHTS

The United States Government may have acquired certain rights in this invention pursuant to Contract No. DAAE30-03-D-1004, awarded by the Department of the Army.

FIELD

The invention relates to measuring systems and more particularly to a method and apparatus for measuring the velocity of a projectile.

BACKGROUND

This present invention solves the problem of providing accurate primary instrumentation for the measurement of the velocity of a projectile. When measuring muzzle velocity, (e.g., a velocity associated with a projectile fired from a rifle or an artillery or mortar launcher), many variables affect the measurement. Examples include barrel wear, propellant temperature, unique propellant burn rate, and air density. While some of these variables can accurately be accounted for individually, when taken in total, it is most efficient to simply measure the muzzle velocity and apply a correction factor to all subsequent firings. Overall, most approaches start with the same premise of detecting the projectile over a measured distance and calculating a time period of travel to resolve velocity.

Radar systems presently are used to analyze a ballistic path but do not provide an actual point of exit measurement (i.e., from the muzzle). Other existing prior art methods comprise the use of various inductive, optical, fiber optic strain gauges, and RF injection to obtain the muzzle velocity of a non-specific barrel guided projectile. The inductive approach exhibits a characteristic reduced frequency response while optical and fiber optic systems are not suitable to the combat environment or are not practical for fielding. RF injection requires that the barrel be penetrated at multiple locations which violates the military standard for barrel structural integrity.

Another, more accurate technique is described in U.S. Pat. No. 7,082,823. Hall effect integrated circuit sensors with pre-conditioned digital signal processing (DSP) are used to accurately produce a time over distance variant function of a projectile. Hall Effect sensors, however, due to their inherently low amplitude signal output derived from the Hall effect, restrict the usable measurement range of a velocity measurement system. For example, while a Hall Effect sensor is effective at measuring projectile velocity in mortar applications, it is less effective or not effective at all for measuring velocity in artillery applications.

Therefore, it is desirable to provide high resolution sensors that enable a broad spectrum of projectile velocities to be measured.

SUMMARY

A method and system for measuring the velocity is presented. The method includes providing a sensor that comprises magnetoresistive sensing elements and using the sensor to calculate a velocity associated with a projectile.

In one example, the method includes providing first and second magnetoresistive sensors that are separated from each other by a distance, D. When a projectile is within a sensing path of the first sensor, a first time measurement, $t_1$, is taken. When the projectile is within a sensing path of the second sensor, a second time measurement, $t_2$, is taken. The velocity, $v_1$, of the projectile is then determined according to the relationship where $v_1 = D \times (t_2 - t_1)^{-1}$.

To take the first and second time measurements, the first and second sensors may employ magnetoresistive sensing elements that comprise an arrangement of ferromagnetic and non-ferromagnetic materials that enable a resistance associated with each of the sensing elements to vary correlatively with an applied magnetic field. The time may be captured by a signal processing device, for example, that receives a first voltage signal from the first sensor and a second voltage signal from the second sensor. Accordingly, the time measurements $t_1$ and $t_2$ may be determined by detecting signal point crossings of each of the first and second voltage signals. Also, by using a dummy target to calculate voltage null points in voltage signals output from the first and second sensors, the separation distance, D, between the sensors may be measured.

In one example, the magnetoresistive sensing elements may be arranged in a Wheatstone bridge configuration. In this configuration, the sensing elements may be arranged to output a differential voltage signal. To further enhance output signals from the sensors, the first and second sensors may also be biased by a magnetic element.

To detect when the projectile crosses a sense path, the projectile includes a target region for establishing a magnetic field fluctuation that is detectable by each of the first and second sensors. In one example, the projectile may comprise a ferrous material and the target region may be designed so that it establishes a variation in the magnetic permeability of the ferrous material. In alternative examples, the projectile may be a bullet, artillery shell, mortar round, or a rail gun projectile. In these alternative examples, the target region may be an orbturator ring channel, a rotating band channel or a non-tapered nose or tail associated with the projectile.

The above method may be carried out, for example, by housing the first and second sensors on a sensor block so that the sensors are aligned with a trajectory path associated with the projectile. In additional examples, the sensor block may be mounted to a rifle muzzle, a blast attenuator, or a muzzle brake.

In an alternative example, a system for measuring the velocity includes the first and second sensors, a projectile that includes a target region, and a signal processing device coupled to receive voltage signals produced by the first and second sensors.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Certain examples are described below in conjunction with the appended drawing figures, wherein like reference numerals refer to like elements in the various figures, and wherein:

FIG. 1 is a block diagram of a mortar launcher that incorporates a sensor block that houses two magnetoresistive based sensors, according to an example;

FIG. 2 is a block diagram of a rifle that incorporates a sensor block that houses two magnetoresistive based sensors, according to an example;

DETAILED DESCRIPTION

Figure 3:
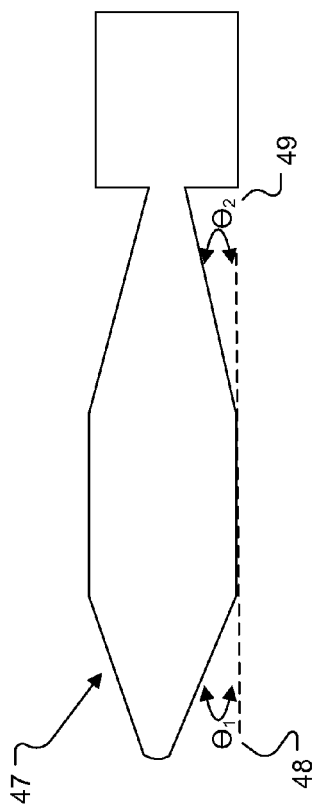
FIG. 3 is a cross section of an example projectile having tapered surfaces that may be used to create fluctuations in a magnetic field.

A method and system for measuring the velocity of a projectile is described. The described method and system employs a sensor that comprises magnetoresistive sensing elements and uses the sensor to calculate a velocity associated with a projectile.

In one described example, at least two magnetoresistive sensors are employed. The sensors are used to measure the transit time of a projectile between the two sensors. The transit interval along with a spacing distance between the sensors allows a processing unit, for example, to calculate the velocity of the projectile. In general, these sensors may be used in artillery systems to calculate the velocity of a projectile, such as a mortar round or an artillery shell. However, other systems or methods of implementation are possible.

The described method and system employs sensors that use magnetoresistive sensing elements. These elements take advantage of the Giant Magnetoresistance Effect, which is a quantum mechanical effect observed in thin film structures composed of alternating ferromagnetic and nonmagnetic metal layers. The effect manifests itself as a significant decrease in resistance from the zero-field state, when the magnetization of adjacent ferromagnetic layers are antiparallel due to a weak anti-ferromagnetic coupling between layers, to a lower level of resistance when the magnetization of the adjacent layers align due to an applied external field. Magnetoresistive based devices are well known for high intrinsic signal output as well as robustness and linearity over temperature. Thus, magnetoresistive sensors provide a high amplitude output and, consequently, an increased signal to noise ratio and improved timing resolution. In addition, the smaller form factor of magnetoresistive sensors facilitates multiple sensor placement (for increased precision or redundant configurations) as well as improved sensor/projectile proximity (and hence signal amplitude).

Turning now to FIG. 1, a velocity measurement system 10 comprises a computer 12, a mortar launcher 14, projectile 16, and a sensor block 18. The sensor block 18 comprises magnetoresistive sensors 19, 20 (see inset 22). The sensors 19, 20 are aligned so that when the projectile 16 is fired from the launcher 14, the projectile 16 travels along a trajectory path 24 that is adjacent to both of the sensors 19, 20. In FIG. 1, the sensor block 18 is mounted at a blast attenuation device 26, however, in alternative examples, the sensor block 18 may be positioned at a variety of locations along the trajectory path 24. For example, a sensor block could be incorporated into an artillery muzzle brake.

The sensors 19, 20, in operation, communicate voltage signals to the computer 12. Preferably, the voltage signals are differential voltage signals (see FIGS. 4D-E). Such signals can be processed so that common mode noise is rejected. However, other types of signals are possible, including current signals. When the projectile 16 (drawn as a mortar round in FIG. 1) traverses the sensor block 18 it will perturb the magnetic fields associated with sensors 19 and 20. This magnetic fluctuation first produces an output from the inboard sensor 19 and the computer 12 detects this event and the time at which it occurred. Some time later, the projectile 16 passes the outboard sensor 20 and the resulting changes in its magnetic environment produces an output that is detected by computer 12 and the event time determined.

Along with the first and second time measurements, the computer 12 uses a predetermined sensor spacing (see FIG. 4A, distance D) to calculate a velocity associated with the projectile 16. It should be understood that although the computer 12 is shown as a conventional desktop computer in FIG. 1, a variety of signal processing devices, displays, etc. may be used to receive voltage signals and accordingly derive or display a velocity measurement. Also, additional electronics may be used to condition the sensor outputs, which may include an amplifier stage and a filter stage. An adaptive filter may be implemented which employs empirical data gathered while monitoring sensor outputs during the actual firing of the projectile 16. In one example, the sensors may include magnetoresistive elements arranged in a Wheatstone bridge configuration (see, e.g., FIGS. 4B-C), enabling common mode noise cancellation at the magnetoresistive sensors' 19, 20 outputs, which allows the sensor conditioning electronics (amplifier and filter) to be located several feet away from the sensors within a resolver assembly (not shown) without affecting signal quality. Such resolver circuitry, for example, could reside on a custom PC card. It could also reside within the sensor block (on a shock isolated mount) as part of a wireless design. The sensor block 18 would then require battery power and the resolved sensor signals would be transmitted wirelessly to the PC.

In general, the computer 12 employs a processor as well as any requisite program instructions stored on a memory (not shown) to derive the velocity measurement. For additional processing examples see U.S. Pat. No. 7,082,823, entitled "Digital Signal Processing Back Biased Hall Effect Muzzle Velocity Measurement System," which is herein incorporated by reference.

To generate the timing information, the sensors 19, 20 detect changes in a magnetic field that are created as the projectile 16 travels along the trajectory path 24. The sensors 19, 20 comprise magnetoresistive elements that are biased by a magnet. Such biasing improves signal quality, however, it should be understood that biasing is not necessary for implementing magnetoresistive-based sensors. The projectile 16, which is typically made from a ferrous material, includes a target region 28 that creates a magnetic field variation sensed by the sensors 19, 20. As shown, the target region 28 occurs about the circumference of the projectile 16 and it includes a ring channel, which is used to secure an obturator ring. In an alternative example, if the projectile is an artillery shell, a target region could include a channel that is used to seat a copper rotating band.

The target region 28 has side channels that are perpendicular to the path of the projectile 16 and present a sudden change in ferrous material with respect to sensor block placement as the target 28 travels past the sensors 19, 20. Both the obturator ring and a copper rotating band are non-ferrous, allowing magnetoresistive sensors to react magnetically only to the channel. Because of the sudden increased distance from the bias magnet as the projectile passes, the channel is perceived by the sensors as a reduction in ferrous material (i.e., a change in permeability). Although such a channel provides one type of detectable discontinuity, generally speaking, any discontinuity in a magnetically active material may be used as a target region. Basically, a feature, defect or discontinuity that rapidly changes a sensor's magnetic environment will produce a useable output.

It is also contemplated that a ferrous material could be bonded to a projectile, which would enable non-ferrous projectiles to likewise produce discontinuities in a sensor's magnetic environment. For example, a projectile that comprises aluminum (Al) or copper (Cu) would not produce a perceived change in magnetic permeability as it passes by a sensor. However, a steel band (or other ferromagnetic material) could be wrapped around a circumference of the projectile, which would enable the sensor to detect discontinuities in an applied magnetic field.

Returning now to FIG. 1, as the target region 28 traverses across a sense path associated with a sensor, a magnetic field fluctuation is sensed. Accordingly, the voltage signals output from the sensors 19, 20 will fluctuate as the projectile travels past each of the sensors 19, 20. To ensure that the sensors 19, 20 detect magnetic field fluctuations, the sensors 19, 20 should be positioned so that the projectile 16 travels through a sensing range associated with the magnetoresistive sensing elements within each of the sensors (described with reference to FIG. 5). In essence, the sense path is made up of the aggregated sensing ranges of each of the magnetoresistive elements that a sensor comprises.

FIG. 2 shows another example velocity measurement system 30 that comprises a computer 32, a rifle 34, a bullet 36, and a muzzle attachment 38. The muzzle attachment 38 comprises sensors 39, 40 (see inset 42) and is mounted to the muzzle of the rifle 34. The system 30 measures velocity in the same manner as the system 10; the sensors 39, 40 are magnetically-biased and used by the computer 32 to detect magnetic field fluctuations. The bullet 36 is steel jacketed and has a non-tapered tail 44 (see inset 46). Similar to the projectile 16, the bullet's 36 tail 44 acts as a target region for inducing changes in the bias magnetic field.

Although sharp variations in material (an edge as opposed to a slope or taper) are preferable, gradual features could also be used as a target region on a projectile. For example, magnetic field fluctuations created by a projectile's tapered nose or tail may be used. FIG. 3 shows a projectile 47 comprising front and back mechanical slopes 48, 49 of the projectile 47. A timing measurement calculation may use averaging techniques on voltage signals that are generated by the slopes that correspond to the slopes 48, 49. Such measurement techniques may require additional program instructions and/or signal processing.

Figure 4:
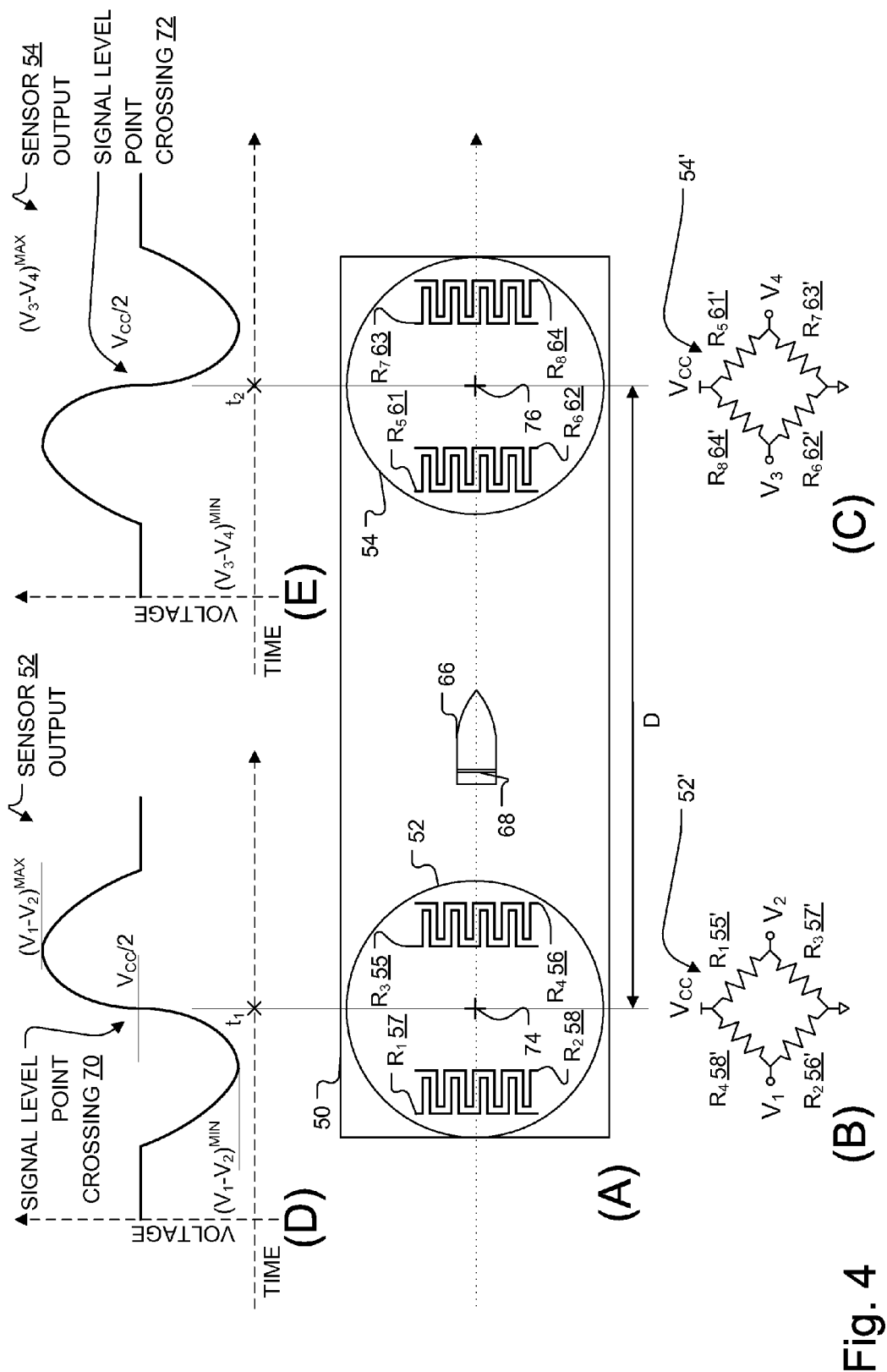
FIG. 4A is a block diagram of an example sensor block.
FIGS. 4B-C are schematic representations of the sensors housed in the sensor block of FIG. 4A.
FIGS. 4D-E are signal diagrams showing an example voltage signal that is generated as a projectile as well as a target region travels past the sensor block of FIG. 4A.

FIG. 4A shows an example sensor block 50 that may be implemented in a variety of velocity measurement systems. The sensor block 50 comprises magnetoresistive sensors 52, 54. The in-board sensor 52 includes magnetoresistive elements 55-58, which are preferably arranged in a Wheatstone bridge configuration (see FIG. 4B). The out-board sensor 54 includes magnetoresistive elements 61-64, which are also arranged in a Wheatstone bridge configuration (see FIG. 4C). The sensors are biased by a magnet (not shown) to improve response, but as described above, this is not required. The sensors 52, 54 are also biased by an applied voltage $V_{CC}$ and produce respective differential outputs $(V_1-V_2)$ and $(V_3-V_4)$. The differential output $(V_1-V_2)$ is the voltage output of the sensor 52. The differential output $(V_3-V_4)$ is the voltage output of the sensor 54.

Although the implementation shown in FIGS. 4A-C is preferable, it should be understood that a variety of magnetoresistive sensor arrangements may be implemented. For example, some of magnetoresistive elements 57, 58 and 61, 64 could be replaced with purely resistive elements. Although the output swing would be lower, a signal indicative of a target region passing by a sensing could still be achieved.

Returning to FIG. 4A, the projectile 66 comprises a ferrous material (such as a projectile casing). When the projectile 66 is in close proximity to a magnetically biased magnetoresistive sense element, it will have the effect of concentrating the bias field lines since the material has a higher permeability than air (or free space). As the magnetic flux density in the sense element increases its resistance will decrease as described above.

Referring to FIG. 4D, the voltage plot is initially at the quiescent amplitude because the entire sensor 52 'sees' the projectile's 66 casing (the bridge circuit is balanced, $V_1=V_2$ and the differential output is $V_{cc}/2$). As a target region 68 (i.e., a magnetic discontinuity, see FIG. 4A) transits the sensor, alternating minima and maxima will be produced at the sensor output. The minimum shown in the first half-cycle of FIG. 4D occurs when ferrous material is positioned adjacent to the magnetoresistive elements 55 and 56 while the target region 68 is adjacent to the elements 57 and 58. The magnetoresistive effect will minimize the resistance of elements 55', 56' in the bridge circuit 52' while elements 57', 58' attain maximum resistance. This in turn forces $V_1$ to its lowest value, $V_2$ to its highest value, and the differential output V1-V2 to its minimum.

As the target region 68 continues to move across the sensor 52, the next output extreme will occur when the ferrous material is adjacent to elements 57, 58 and the target region 68 is adjacent to elements 55, 56. This will force $V_1$ to its maximum, $V_2$ minimum and the differential signal $V_1-V_2$ to its maximum value. Between these two extremes, the signal will once again pass through $V_{cc}/2$ (or the balanced bridge condition). The operation shown in FIG. 4E, at some later time when the target region 68 transits sensor 54, is analogous.

In general, the voltage output of the sensors 52 and 54 is a sinusoidal pulse. Also, although not shown in FIG. 4D, additional signal processing may be employed to remove noise or modify the pulse characteristics. Such signal processing may be carried out within a resolver or within a processing unit.

In a similar fashion, FIG. 4E shows the differential output $(V_3-V_4)$ of the out-board sensor 54 that is produced when the target region 68 crosses the sensor 54. Similar to the voltage output of the sensor 52, the voltage output of the sensor 54 also resembles a sine pulse. Generally speaking, however, it should be understood that the output signal of a sensor may be modified or adapted in a variety of ways. For example, the polarity of voltage signals produced by either of the sensors 52, 54 could be reversed. Alternatively, the shape of the waveform may vary with the magnitude of the applied voltage $V_{CC}$ and the arrangement of the magnetoresistive elements. The shape of the waveform may also be adapted by including additional magnetoresistive elements (for increased precision or to implement a redundant configuration to improve reliability).

To take a time measurement, the differential signals are communicated to a processing unit that detects signal level point crossings 70, 72. The output signal passes through signal point crossing 70 at a time $t_1$ when the differential signal $(V_1-V_2)$ crosses $V_{CC}/2$. The signal level point crossing 72 occurs at a time $t_2$ when the differential signal $(V_3-V_4)$ crosses $V_{CC}/2$. Although any point on the output voltage signals of the sensors 52, 54 could be used to take a time measurement, the signal level point crossings are preferable because they occur at the mid-point of each of the sensors 52, 54 and provide the best time resolution (since dV/dt is at its maximum). In FIG. 4A, mid-point 74 corresponds to the signal level point crossing 70 and the mid-point 76 corresponds to the signal level point crossing 72.

The distance, D, between the mid-point 74 and the mid-point 72 may then be used along with the time measurements $t_1$ and $t_2$ to calculate the velocity of the projectile 66. The velocity, $v_1$, of the projectile 66 may be calculated using the following formula:

$$v_1 = D \times (t_2 - t_1)^{-1}$$

The distance, D, between two sensors may be determined using a calibration method that that involves securing a dummy target on a linear slide driven by a long-travel micrometer, for example. The target, such as an angular piece of steel may be traversed across a sensor block while monitoring sensor output on a millivolt meter. Internal resistive elements within the sensor will provide a voltage "null point" when the target stimulus is exactly equidistant between the differential sensor elements. The micrometer reading for this "null point" is noted and the micrometer is used to move the target over the second sensor to identify its "null point". The difference between the micrometer readings is the distance value between the two sensor centers (e.g., the midpoints 74, 76). Such a measurement technique may accurately measure the distance, D, to within a thousandth of a millimeter.

Figure 5:
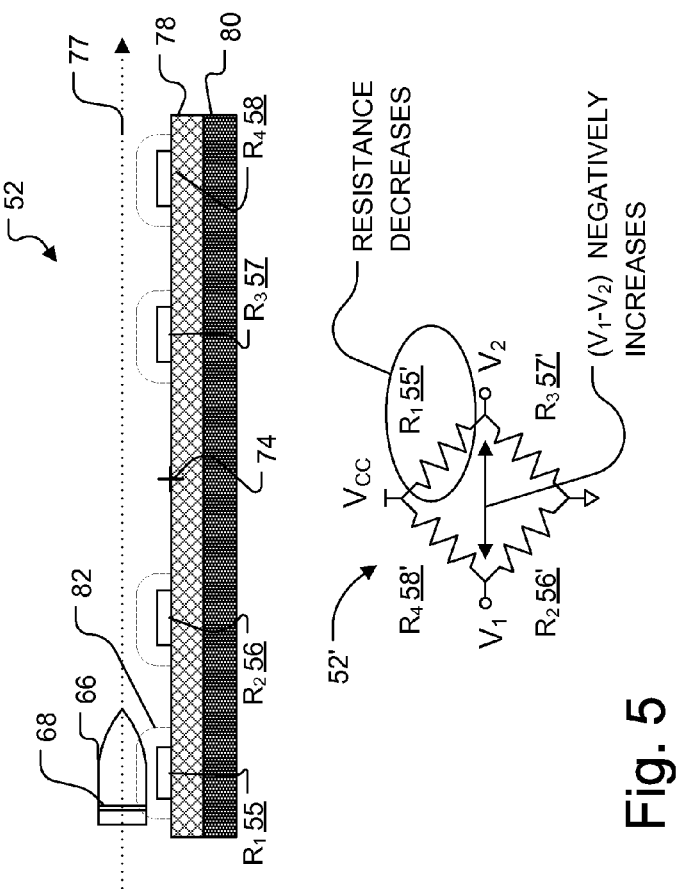
FIG. 5 is a cross-sectional diagram of one of the sensors housed in the sensor block of FIG. 4A, according to an example.

FIG. 5 shows an example cross-section of the sensor 52 and an arrangement of the magnetoresistive elements 55-59 that may be used to measure the velocity of the projectile 66. The projectile 77 travels along a trajectory path 77 that is adjacent to and parallel with the plane of the sensor 52. The sensor 52 includes a substrate 78 for mounting magnetoresistive elements 55-58. The magnetoresistive elements 55-58 may comprise a variety of materials and layering arrangements in order to achieve a desired resistance variation that is correlative with fluctuations or variations in magnetic field. Example materials and layers include, but are not limited to multilayer arrangements, which comprise ferromagnetic layers (e.g., Co, Fe, $FeOFe_2O_3$, $NiOFe_2O_3$, $CuOFe_2O_3$, $MgOFe_2O_3$, etc.) separated by a non-ferromagnetic spacer layer (e.g., Cr, Cu, Al, etc.). It is also contemplated that elements 55-58 could comprise granular based magnetoresistive elements (i.e., solid precipitates of a magnetic material in a non-magnetic matrix). The elements 55-58 may also be encapsulated within an epoxy (not shown). Furthermore, to bias the elements 55-58 and thereby enhance signal amplitude, below the elements 55-58 and the substrate 78 is a magnetic layer 80.

By virtue of the element's 55 magnetoresistive makeup, when the target region 68 is within a sensing range 82 of the element 55, the resistance of the element 55 decreases. Consequently, the differential voltage ($V_1-V_2$) decreases. As the target range 68 exits the sensing range 82, the resistance of the element 55 will increase. Likewise, as the target region 68 enters and exits the sensing range of each of the elements 55-58 and 61-64, their resistance will be affected. Generally speaking, the sensing range 82 includes an offset distance of about 5 mm from the surface of a magnetoresistive element. However, it should be understood that the offset distance associated with a sensing range can be tailored to the application the sensor 52 is being used for.

Figure 6:
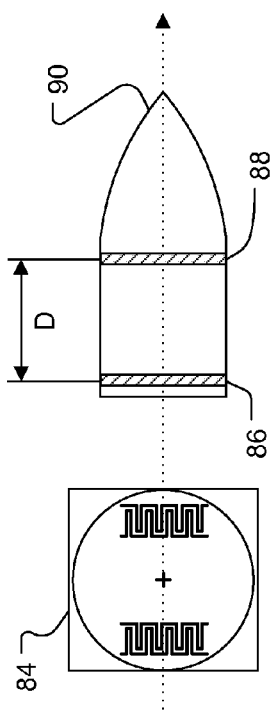
FIG. 6 is a block diagram of a single magnetoresistive sensor and a projectile that includes two target regions separated by a distance, D.

Those skilled in the art will understand that changes and modifications may be made to these examples without departing from the true scope and spirit of the present invention, which is defined by the claims. For example, it is contemplated that a single magnetoresistive based sensor could be employed and a projectile could accommodate two target regions. FIG. 6 shows such a scenario, where a magnetoresistive sensor 84 is configured to sense signal point crossings associated with target regions 86, 88 located on a projectile 90. By using the spacing distance, D, between the target region and the times at which the sensor detects the single point crossings, the velocity of the projectile 90 may be calculated.

Thus, it should be understood that a variety of systems may employ magnetoresistive based sensors that are arranged in a manner that allows the velocities of interest to be determined. Such systems may measure projectile velocities of up to, but not limited to, 1000 meters per second. Also, a wide variety of easily deployable, inexpensive, reliable, and discreet systems may be designed. Thus, the presented figures are intended to generally convey example arrangements of systems that employ magnetoresistive based sensors but they should not be viewed as limiting. For example, the velocity of a steel rod or bar from a rail gun could be measured using magnetoresistive sensors. Alternatively, a metallic band could be mounted to a non-ferrous material, hence creating a target region around any given projectile. Also, in principle, the velocities that can be measured with this technique can be made arbitrarily high by increasing the inter-sensor spacing (FIG. 4A, distance D) and/or increasing the timing resolution of the sensed events. Furthermore, additional magnetoresistive sensors and or magnetoresistive elements may be used in order to provide a measure of redundancy and/or to increase output signal quality.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

The invention claimed is:

1. A method for measuring the velocity of a projectile, the method comprising:
   providing first and second magnetoresistive sensors that are biased by an applied voltage, wherein the first and second sensors are separated from each other by a distance, D;
   when a projectile is within a sensing path of the first sensor, communicating a first voltage signal from the first magnetoresistive sensor to a signal processing device and taking a first time measurement, $t_1$, to be a signal point crossing of the first voltage signal, wherein at the signal point crossing the first voltage signal has a magnitude of about half the applied voltage;
   when the projectile is within a sensing path of the second sensor, communicating a second voltage signal from the second magnetoresistive sensor to the signal processing device and taking a second time measurement, $t_2$, to be a signal point crossing of the second voltage signal, wherein at the signal point crossing the second voltage signal has a magnitude of about half the applied voltage; and
   calculating a velocity, $v_1$, of the projectile, wherein $v_1 = D \times (t_2-t_1)^{-1}$.

2. The method of claim 1, wherein the first and second magnetoresistive sensors comprise an arrangement of ferromagnetic and non-ferromagnetic materials that enable a resistance associated with each of the first and second magnetoresistive sensors to vary correlatively with an applied magnetic field.

3. The method of claim 1, wherein the first and second sensors each comprise magnetoresistive sensing elements that are arranged in a Wheatstone bridge configuration and are biased by a magnetic element.

4. The method of claim 1, wherein the projectile comprises a target region for establishing a magnetic field fluctuation that is detectable by each of the first and second sensors, and wherein the first and second sensors are configured to output a voltage signal indicative of the target region being within a sensing range of magnetoresistive sensing elements associated with each of the first and second sensors.

5. The method of claim 4, wherein the projectile comprises a ferrous material, and wherein the target region establishes a variation in the magnetic permeability of the ferrous material.

6. The method of claim 4, wherein the projectile is selected from the group consisting of a bullet, an artillery shell, a mortar round, and a rail gun projectile, and wherein the target region is selected from the group consisting of an orbturator ring channel, a rotating band channel, and at least one of a nose and tail associated with the projectile.

7. The method of claim 4, wherein the projectile comprises a magnetically inert material and the target region comprises a magnetic region affixed to the projectile.

8. The method of claim 1, wherein the first and second voltage signals are differential and each are output from magnetoresistive sensing elements that are arranged in a Wheatstone bridge configuration.

9. The method of claim 1, further comprising determining the distance D by using a dummy target to calculate voltage null points in voltage signals output from the first and second sensors.

10. The method of claim 1, wherein a sensor block houses the first and second magnetoresistive sensors, and wherein the sensor block aligns the first and second magnetoresistive sensors to a trajectory path associated with the projectile.

11. The method of claim 10, wherein the sensor block is mounted to at least one of a rifle muzzle, a blast attenuator, and a muzzle brake.

12. A system for measuring the velocity of a projectile, the system comprising:
first and second sensors each comprising magnetoresistive sensing elements that are biased by an applied voltage, wherein the first and second sensors are separated from each other by a distance D;
a projectile comprising a target region for establishing a magnetic field fluctuation that is detectable by each of the first and second sensors, and wherein the sensors are configured to output a voltage signal indicative of the target region being within a sensing range of each of the magnetoresistive sensing elements; and
a signal processing device coupled to the first and second sensors to receive voltage signals produced by the first and second sensors, wherein the processing device, in operation, calculates the velocity of the projectile by (i) taking a first time measurement, $t_1$, to be a signal point crossing of a first voltage signal received from the first sensor, wherein at the signal point crossing the first voltage signal has a magnitude of about half the applied voltage; and (ii) taking a second time measurement, $t_2$, to be a signal point crossing of a second voltage signal received from the second sensor, wherein at the signal point crossing the second voltage signal has a magnitude of about half the applied voltage.

13. The system of claim 12, wherein the projectile is selected from the group consisting of a bullet, an artillery shell, a mortar round, and a rail gun projectile, and wherein the target region is selected from the group consisting of an orbturator ring channel, a rotating band channel, and at least one of a non-tapered nose and tail associated with the projectile.

14. The system of claim 12, wherein the magnetoresistive elements of each of the first and second sensors are arranged in a Wheatstone bridge configuration.

15. The system of claim 12, wherein the magnetoresistive sensing elements comprise an arrangement of ferromagnetic and non-ferromagnetic materials that enable a resistance associated with each of the first and second sensors to vary correlatively with an applied magnetic field.

16. The system of claim 12, wherein the projectile comprises a ferrous material, and wherein the target region establishes a variation in the magnetic permeability of the ferrous material.

17. The system of claim 12, wherein the processing device comprises a memory that includes processing instructions executable by a processor to carry out a process that comprises:
calculating a velocity, $v_1$, of the projectile, wherein $v_1 = D \times (t_2-t_1)^{-1}$ and D is a separation distance between the first and second sensors.

18. The system of claim 17, wherein the process further comprises directing the processor to measure signal levels associated with the voltage signals produced by the first and second sensors.

* * * * *